US012064661B2

(12) United States Patent
Hales et al.

(10) Patent No.: US 12,064,661 B2
(45) Date of Patent: Aug. 20, 2024

(54) ADJUSTABLE EXERCISE BAR DEVICE FOR SPA AND METHODS OF USE

(71) Applicant: BULLFROG INTERNATIONAL, LC, Herriman, UT (US)

(72) Inventors: Eric Hales, Eagle Mountain, UT (US); Mark McLane, Lehi, UT (US); Robert Santos, Daybreak, UT (US)

(73) Assignee: BULLFROG INTERNATIONAL, LC, Herriman, UT (US)

( * ) Notice: Subject to any disclaimer, the term of this patent is extended or adjusted under 35 U.S.C. 154(b) by 421 days.

(21) Appl. No.: 17/467,106

(22) Filed: Sep. 3, 2021

(65) Prior Publication Data

US 2023/0073056 A1 Mar. 9, 2023

(51) Int. Cl.

| | |
|---|---|
| ***A63B 21/00*** | (2006.01) |
| ***A61H 33/00*** | (2006.01) |
| ***A63B 21/04*** | (2006.01) |
| ***A63B 21/055*** | (2006.01) |

(Continued)

(52) U.S. Cl.
CPC ..... *A63B 21/4035* (2015.10); *A61H 33/6005* (2013.01); *A63B 21/0442* (2013.01); *A63B 21/0552* (2013.01); *A63B 21/16* (2013.01); *A63B 22/0076* (2013.01);
(Continued)

(58) Field of Classification Search
CPC ............ A63B 21/4035; A63B 21/0442; A63B 21/0552; A63B 21/16; A63B 22/0076; A63B 2022/0079; A63B 2208/03; A63B 2225/09; A63B 71/023; A63B 2069/062; A63B 69/08; A63B 2210/50; A61H 33/6005; A61H 2201/10; A61H 33/6089; A61H 2201/1261
See application file for complete search history.

(56) References Cited

U.S. PATENT DOCUMENTS 3,471,145 A * 10/1969 Berger ............. A63B 21/00072 482/112
5,106,078 A * 4/1992 Rowe ................. A63B 21/0606 482/92

(Continued)

OTHER PUBLICATIONS

European Patent Office, "Extended European search report," European Application No. 22193753.5, Jan. 10, 2023.

(Continued)

*Primary Examiner* — Andrew S Lo
(74) *Attorney, Agent, or Firm* — Dentons Durham Jones Pinegar; Sarah W. Matthews

(57) ABSTRACT

A system and method for providing an exercise bar for a user to use for rowing or other exercises in the water of the spa or adjacent to the spa. The exercise bar may comprise a central hub, and two sides, each with a first inner tube attached to opposing side of the central hub and a an outer tube in telescoping connection with the inner tube, and a handgrip in connection with the first outer tube. A connector may be mounted to the central hub, the connector to enable the exercise bar to be connected to one or more resistance cables. The exercise bar may be adjustable from a first, shorter length for use with exercises in which a user's hands are positioned closer together and a second, longer length for use with exercises in which a user's hands are positioned father apart.

16 Claims, 5 Drawing Sheets

(51) Int. Cl.
*A63B 21/16* (2006.01)
*A63B 22/00* (2006.01)

(52) U.S. Cl.
CPC .. *A61H 2201/10* (2013.01); *A63B 2022/0079* (2013.01); *A63B 2208/03* (2013.01); *A63B 2225/09* (2013.01)

(56) References Cited

U.S. PATENT DOCUMENTS

| | | | | |
|---|---|---|---|---|
| 5,554,091 | A * | 9/1996 | Patey | A63B 21/4011 482/121 |
| 5,571,064 | A * | 11/1996 | Holm | A63B 21/4043 482/904 |
| 7,326,157 | B2 * | 2/2008 | Wu | A63B 21/0552 482/121 |
| 7,591,763 | B1 * | 9/2009 | Fucci | A63B 21/4013 482/52 |
| 8,678,983 | B1 * | 3/2014 | Brown | A63B 23/03541 482/131 |
| 10,220,248 | B1 * | 3/2019 | Bellerive | A63B 69/08 |
| 10,806,960 | B2 * | 10/2020 | Sanseverino | A63B 21/169 |
| 11,213,712 | B1 * | 1/2022 | Lejuez | A63B 23/1209 |
| 2003/0100411 | A1 * | 5/2003 | Walker | A63B 21/0084 482/55 |
| 2004/0185990 | A1 * | 9/2004 | Orescan | A63B 69/36 482/121 |
| 2005/0101453 | A1 * | 5/2005 | Jeneve | A63B 21/4017 482/106 |
| 2009/0054210 | A1 * | 2/2009 | Tomatis | A63B 22/0605 482/23 |
| 2011/0251033 | A1 * | 10/2011 | Blancher | A63B 22/16 482/123 |
| 2011/0271436 | A1 * | 11/2011 | Kite | A63B 69/12 4/509 |
| 2014/0295983 | A1 * | 10/2014 | Nooner | A63B 69/3623 473/223 |
| 2016/0047405 | A1 * | 2/2016 | Curley | A63B 21/4033 482/139 |
| 2021/0023413 | A1 | 1/2021 | Nurge | |
| 2021/0154521 | A1 * | 5/2021 | Wu | A63B 21/4035 |
| 2021/0154522 | A1 * | 5/2021 | Wu | A63B 21/4043 |

OTHER PUBLICATIONS

Australian Patent Office, "First Examination Report," Australian Application No. 2022224852, Apr. 27, 2023.
Canadian Patent Office, "Examiner's Report," Canadian Application No. 3, 171, 193, Nov. 17, 2023.

* cited by examiner

ADJUSTABLE EXERCISE BAR DEVICE FOR SPA AND METHODS OF USE

TECHNICAL FIELD

The present disclosure relates generally to a system and method an exercising apparatus for developing or strengthening the muscles or joints of the body by working against a counterforce. More specifically, the present disclosure relates to a method and device for providing a horizontal bar that may be used as a rowing-type exercising apparatus and/or other resistance exercises for use with a pool or spa.

BACKGROUND

Swim spas and pools offer good exercise for users through swimming; however, it can also be useful to provide other methods of resistance exercise in conjunction with a swim spa or pool. Known methods of “rowing” exercises in a swim spa or pool provide a user experience that simulates rowing a boat through water. That is, two separate oar-like bars are typically provided, each mounted to opposing walls and attached to resistance points. While this experience may simulate the experience of rowing a boat with two oars through water, it may not be similar to a user’s experience with traditional rowing machines typically found in gyms.

Additionally, it may be desirable to provide a plurality of resistance exercises that can be used with a single piece of exercise equipment in conjunction with a spa, such that the user does not have to purchase multiple pieces of exercise equipment to do multiple types of exercises.

SUMMARY OF DISCLOSURE

According to the present disclosure, a spa exercise system may comprise:

BRIEF DESCRIPTION OF DRAWINGS

The following drawings illustrate what are currently considered to be specific representative configurations for carrying out the invention and are not limiting as to embodiments which may be made in accordance with the present invention. The components in the drawings are not necessarily to scale relative to each other. Like reference numerals designate corresponding parts throughout the several views.

The drawings are illustrative and not limiting of the scope of the invention which is defined by the appended claims. The various elements of the invention accomplish various aspects and objects of the invention. Not every element of the invention can be clearly displayed in a single drawing, and as such not every drawing shows each element of the invention.

DETAILED DESCRIPTION

Figure 1:
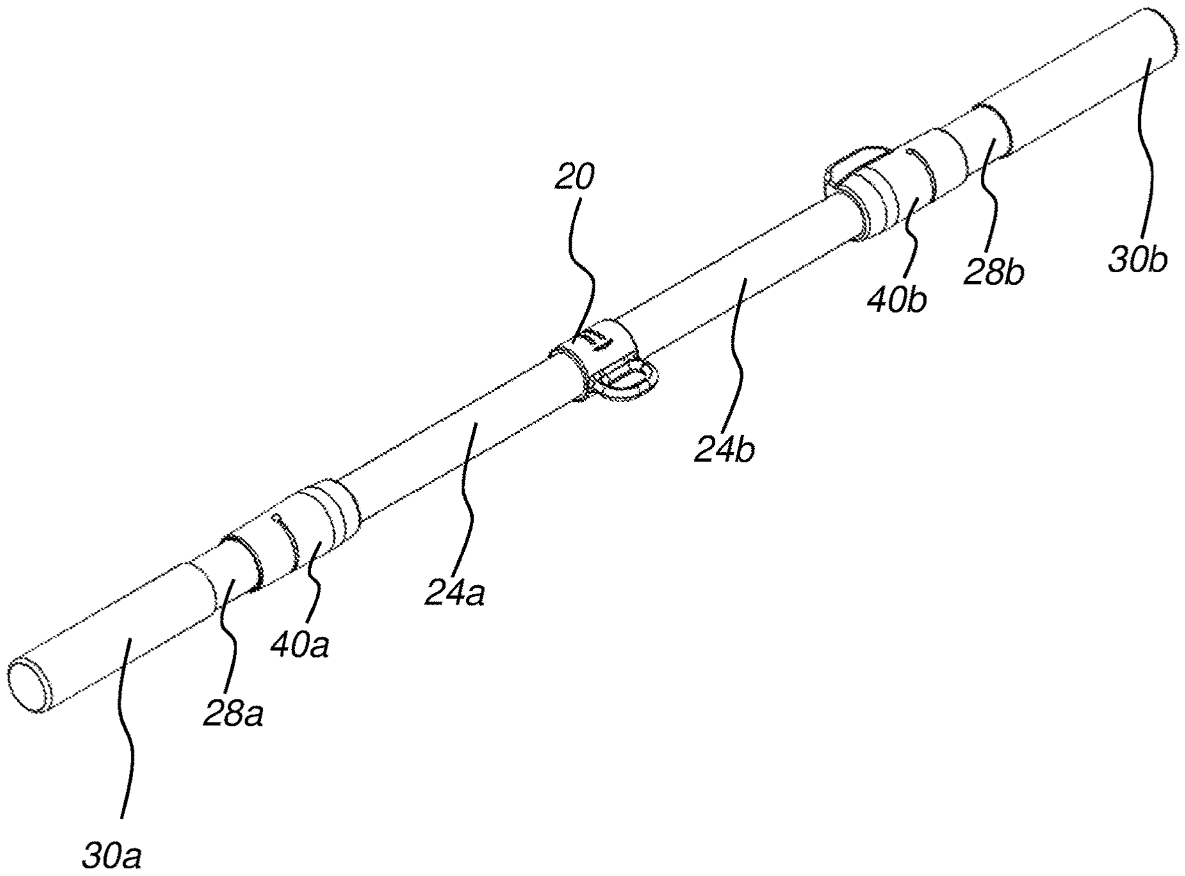
FIG. 1 is a perspective view of an embodiment of an exercise bar that may be used with a swim spa.

The following provides a detailed description of particular embodiments of the present invention. Reference will now be made to the drawings in which the various elements of the illustrated configurations will be given numerical designations and in which the invention will be discussed to enable one skilled in the art to make and use the invention. It is to be understood that the following description is only exemplary of the principles of the present invention, and should not be viewed as narrowing the scope of the claims which follow, which claims define the full scope of the invention.

It will be appreciated that various aspects discussed in one drawing may be present and/or used in conjunction with the embodiment shown in another drawing, and each element shown in multiple drawings may be discussed only once. For example, in some cases, detailed description of well-known items or repeated description of substantially the same configurations may be omitted. This facilitates the understanding of those skilled in the art by avoiding an unnecessarily redundant description. The accompanying drawings and the following description are provided in order for those skilled in the art to fully understand the present disclosure, and these are not intended to limit the scope of claims. All statements herein reciting principles, aspects, and embodiments of the invention, as well as specific examples thereof, are intended to encompass equivalents thereof.

Reference in the specification to “one configuration” “one embodiment,” “a configuration” or “an embodiment” means that a particular feature, structure, or characteristic described in connection with the configuration is included in at least one configuration, but is not a requirement that such feature, structure or characteristic be present in any particular configuration unless expressly set forth in the claims as being present. The appearances of the phrase “in one configuration” in various places may not necessarily limit the inclusion of a particular element of the invention to a single configuration, rather the element may be included in other or all configurations discussed herein.

Furthermore, the described features, structures, or characteristics of configurations of the invention may be combined in any suitable manner in one or more configurations. In the following description, numerous specific details are provided, such as examples of products or manufacturing techniques that may be used, to provide a thorough understanding of configurations of the invention. One skilled in the relevant art will recognize, however, that configurations of the invention may be practiced without one or more of the specific details, or with other methods, components, materials, and so forth. In other instances, well-known structures, materials, or operations are not shown or described in detail to avoid obscuring aspects of the invention.

As used in this specification and the appended claims, singular forms such as “a,” “an,” and “the” may include the plural unless the context clearly dictates otherwise. Thus, for example, reference to “an anchor” may include one or more of such anchors, and reference to “the coupling member” may include reference to one or more of such coupling members.

As used herein, the term “generally” refers to something that is more of the designated adjective than not, or the converse if used in the negative. As used herein, the term “about” is used to provide flexibility to a numerical range endpoint by providing that a given value may be “a little above” or “a little below” the endpoint while still accomplishing the function associated with the range, for example, “about” may be within 10% of the given number or given range. As used herein, a plurality of items, structural elements, compositional elements, and/or materials may be presented in a common list for convenience. However, these lists should be construed as though each member of the list is individually identified as a separate and unique member.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 5 to about 60" should be interpreted to include not only the explicitly recited values of about 1 to about 5, but also include individual values and sub-ranges within the indicated range. Thus, included in this numerical range are individual values such as 6, 7, 8, 9, etc., through 60, and sub-ranges such as from 10-20, from 30-40, and from 50-60, etc., as well as each number individually. This same principle applies to ranges reciting only one numerical value as a minimum or a maximum. Furthermore, such an interpretation should apply regardless of the breadth of the range or the characteristics being described. Additionally, the word "connected" and "coupled" is used throughout for clarity of the description and can include either a direct connection or an indirect connection.

The present disclosure relates generally to a system and method for providing an exercise bar for use in conjunction with a spa, swim spa, pool, etc. As used herein, "spa" or "swim spa" refers to a hot tub, swim spa, and/or a jetted tub, whether in ground or aboveground. It will be appreciated that while the exercise bar described herein is described in reference to a spa, it may be similarly used in conjunction with a pool or other swimming system. Similarly, "spa shell" refers to the outer shell or structure of the spa, and encompasses the outer structure of a spa or any other swimming vessel, such as the outer structure of a pool, etc. Thus, "spa shell" means both the shell of a spa, the deck of a pool, and other equivalents.

As used herein, "spa," "spa tub," and "heated spa," may be used to refer to a heated or unheated pool or spa, including the shell of a spa, the shell of the spa with a cabinet, an in-ground spa, or an aboveground spa. As used herein, "length" and "width" may be interchangeable. For example, an exercise bar may have a specific length of 21 inches, but because a user grips the bar on either end, this length may also be referred to as the width of the exercise bar because it provides a specific width apart for the user's hands.

Figure 2:
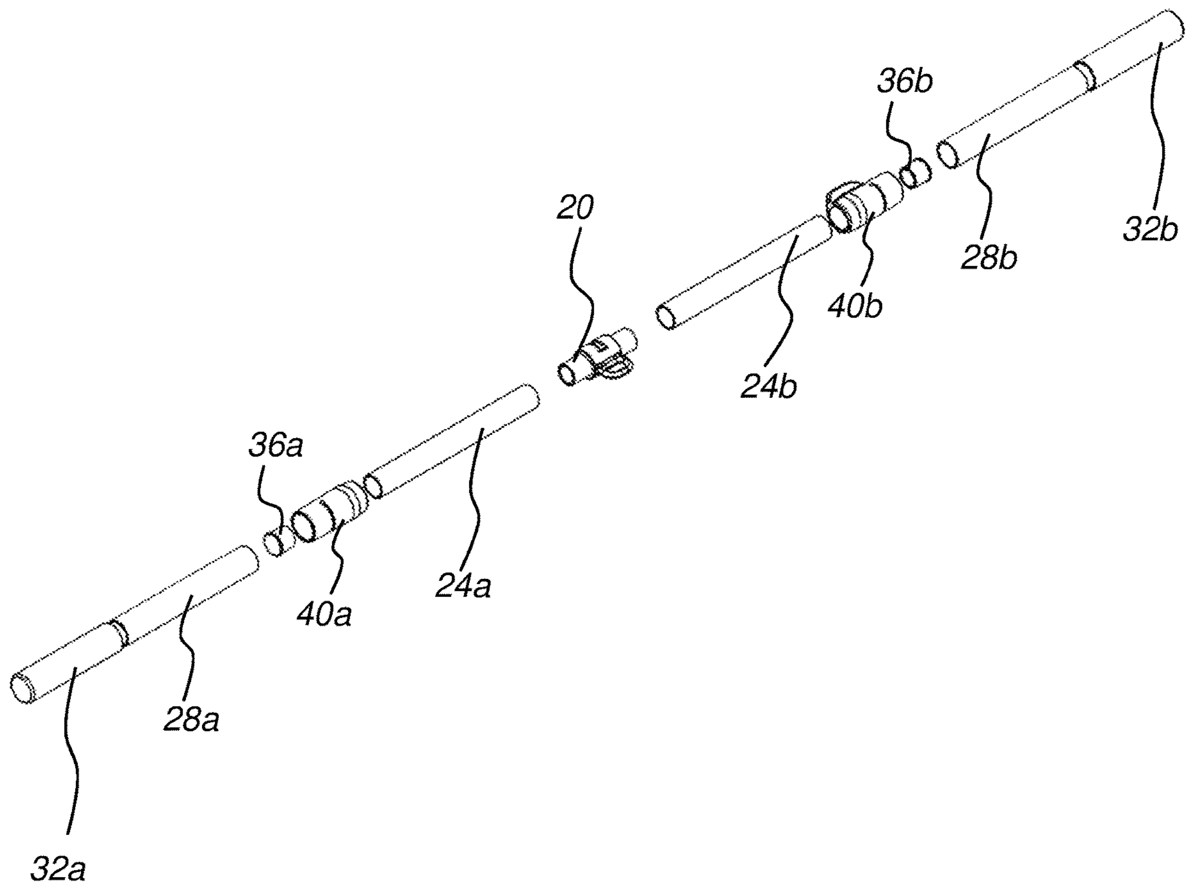
FIG. 2 is an exploded view of the embodiment of an exercise bar shown in FIG. 1.

FIGS. 1-2 show an exemplary configuration of an embodiment of an exercise bar 10. The exercise bar may be used in conjunction with any number of exercises either within the water of the spa 15, or outside the water and proximal to the spa. The exercise bar 10 may be adjusted, as described below, so that it may be used for exercises typically done with standard cable machines, whether the exercises require a shorter bar or a longer bar, and whether the user desires to do the exercises with the added resistance in the water of the spa, or outside the water adjacent to the spa 15. Without limitation, the exercise bar 10 may be used for rowing, barbell curls, single arm curls, double arm curls, lateral raises, Egyptian raises, tricep rope pushdowns, single arm tricep pulldowns, single arm shoulder press, double arm shoulder press, standing lifts, rear delt rows, squats, hamstring extensions, calf raises, hip adduction, hip abduction, lateral pulls, lateral pushdowns, tricep extensions, chest press, shoulder press, crossovers, etc. All these exercises may be done with a single exercise bar 10, by adjusting the length of the exercise bar 10 and without the need to change the exercise bar for another exercise bar of a different length.

The configuration of the exercise bar 10 shown in FIGS. 1-2 may include a central hub 20, an inner tube 24 on each side of the central hub 20, and an outer tube 28 on each side of the central hub 20 (for example, inner tube 24*a* on a first side of the central hub 20 and inner tube 24*b* on a second side of the central hub 20 and similarly outer tube 28*a* on a first side of the central hub 20 and outer tube 28*b* on a second side of the central hub 20). The inner tube 24 and the outer tube 28 may be configured to telescope, as described in more detail below, so that the exercise bar 10 may be adjusted to two or more lengths. In other configurations, the exercise bar may be adjusted through other means, as described in more detail below.

The central hub 20 may include a connector 30 attached to the central hub. The connector 30 may be pivotably connected to the central hub 20, or may be attached in a single fixed position. The connector 30 may allow the exercise bar to be attached via one or more resistance cables to one or more anchors in the spa shell, as described in more detail below. A pivotable connector may allow the exercise bar 10 to rotate or swivel with respect to the resistance cables attached thereto, while a fixedly attached connector may not allow the exercise bar 10 to rotate with respect to resistance cables attached thereto. Depending on the desired exercise experience, a pivotable connector or a fixed connector may be provided.

In some configurations, one or more of the outer tubes 28*a*, 28*b* may be provided with a handle 32 for comfort and ease in gripping the exercise bar 10. For example, the exercise bar 10 may be provided with a first handle 32*a* or handgrip to be gripped by a user's left hand and/or a second handle 32*b* or handgrip to be gripped by a user's right hand. In configurations with hollow outer tubes 28*a*, 28*b*, the handle 32 may also serve to close the hollow end of the tube such that water does not enter the outer tube 28. This may help in enabling the exercise bar 10 to float on the water, which may be more convenient for use. Similarly, each of the inner tubes 24*a*, 24*b* on each side of the central hub 20 may be provided with an inner tube cap 36*a*, 36*b*. In other configurations, inner tube caps 36 may not be provided.

Figure 3:
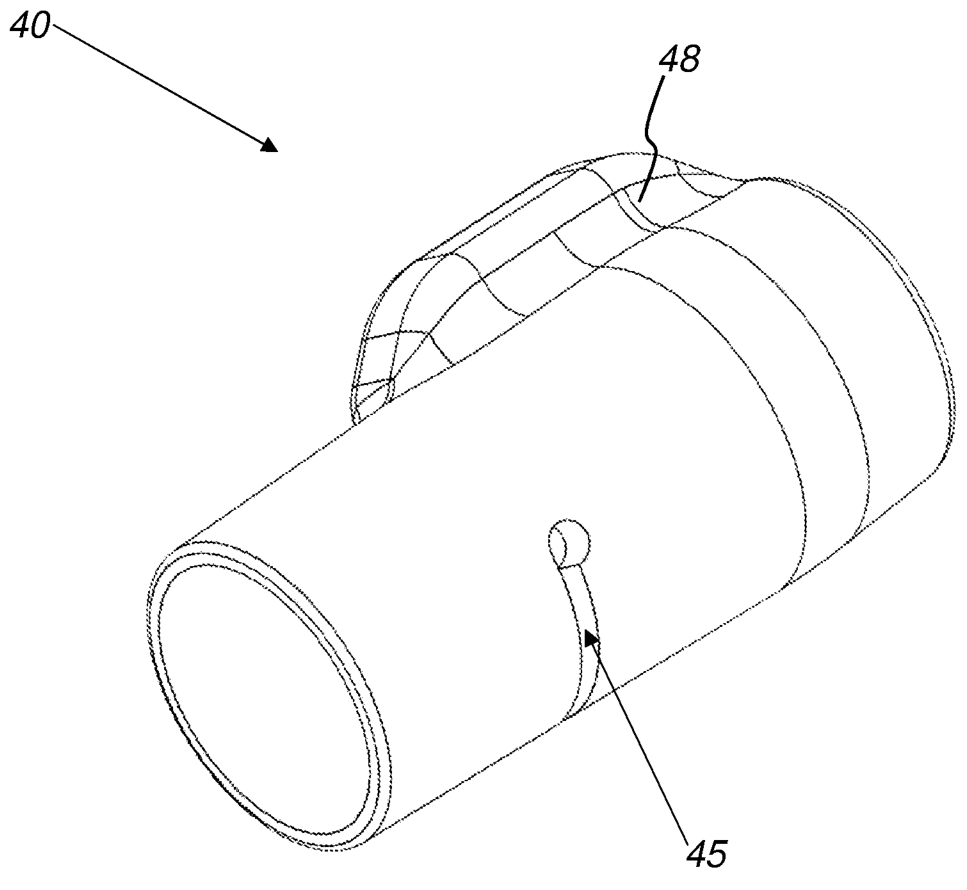
FIG. 3 is a perspective view of an embodiment of a connector that may be used with the exercise bar of FIG. 1.

The exercise bar 10 may also include an attachment mechanism to attach the inner tube 24 to the outer tube 28. A clamp assembly 40 may attach the inner tube 24 to the outer tube 28. For example, a first clamp assembly 40*a* may be provided to attach first inner tube 24*a* to first outer tube 28*a*. Similarly, a second clamp assembly 40*b* may be provided to attach second inner tube 24*b* to second outer tube 28*b*. The second clamp assembly 40*b* may be on an opposing side of the central hub 20 from the first clamp assembly 40*a*. As seen in FIG. 3, the clamp assembly 40 may be a telescoping clamp assembly and may include a cut-away groove 45 or channel to allow flexibility in the clamp assembly 40 and generate a suitable amount of friction for both the clamped and released states. For clamp assemblies 40 that twist to lock and unlock, a projection 48 or tab may be provided to assist a user in twisting the clamp assembly into the locked or unlocked position. In other configurations, a projection may not be provided. The clamp assembly 40 may also include one or more screws or other attachment means, for example, on or more a projection 48, to provide a suitable amount of compression force on the clamp assembly 40.

Any suitable type of locking mechanism can be used to lock the inner tube 24 relative to the outer tube 28 and thus adjust the length of the exercise bar. For example, an external lever lock may be used, such as a flip lever clamp. An external lever-lock is a lever-based, clamp-like mechanism that allows for easy locking and unlocking of locking mechanism to adjust the length of the exercise bar 10. Other types of clamps, such as clamshell and cam lock clamps, may also be used. In other configurations, a twist lock may be used. Or a combination of twist locks, external lever locks, etc. may be used to achieve a balance between the strength, weight, and ease of use for the exercise bar 10. One or more compression rings may also be provided to provide additional compression for telescoping as needed.

In other configurations, the exercise bar 10 may be machined with a plurality of holes in one of the outer tube 28 and/or inner tube 24, and provided with quick release ball lock pins to connect the inner tube 24 and outer tube 28 together at various discrete lengths. In other configurations, one or more of the inner tube 24 and/or outer tube 28 may be machined with a plurality of holes and the other of the inner tube 24 and/or outer tube 28 may be provided with button clips to adjust the length of the exercise bar 10. Other types of connection means to secure the inner tube 24 to the outer tube 28 at variable lengths may also be used.

Exercise bars are typically designed with different widths or lengths to concentrate the user's movement towards specific muscle groups. For example, rowing bars may typically be narrower because a narrow bar (with a shorter length) tends to keep a user's arms straight out and parallel with each other as desired when rowing. Other exercises like pulldowns usually use a wider bar. Using telescoping techniques, both widths may be achieved in a single exercise bar 10.

Figure 4:
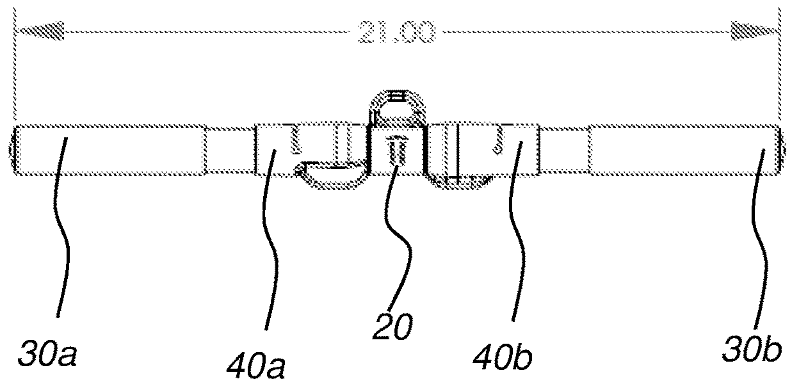
FIG. 4 is a front, plan view of an embodiment of an exercise bar shown in a retracted position.

FIG. 4 shows the exercise bar 10 in a first, retracted or shorter position. The first clamp assembly 40*a* may be positioned adjacent or immediately adjacent to a first side of the central hub 20, and the second clamp assembly 40*b* may be positioned adjacent or immediately adjacent to a second side of the central hub 20 (the second side of the central hub 20 being opposed to the first side). The inner tubes 24*a*, 24*b* may be entirely or nearly entirely telescoped by the outer tubes 28*a*, 28*b*, respectively. That is, the first inner tube 24*a* may be telescoped inside the first outer tube 28*a* and the second inner tube 24*b* may be telescoped inside of the second outer tube 28*b*, respectively.

This first, retracted or shorter position may be desirable for some exercises. For example, for providing a rowing experience within the spa, a shorter exercise bar 10 may be desired. Rowing bars may typically be, for example, 21 inches wide, and this narrow bar tends to keep a user's arms straight out and parallel with each other as desired when rowing. The exercise bar 10 in this first, retracted or shorter position may be configured to have any length desired. For example, in the exemplary configuration shown in FIG. 4, the length may be around 43 centimeters to around 63 centimeters. In other configurations the length may be around 48 centimeters to around 58 centimeters. Even more specifically, the length may be around 53 centimeters or 21 inches. In other configurations, the length may be longer or shorter as desired.

Figure 5:
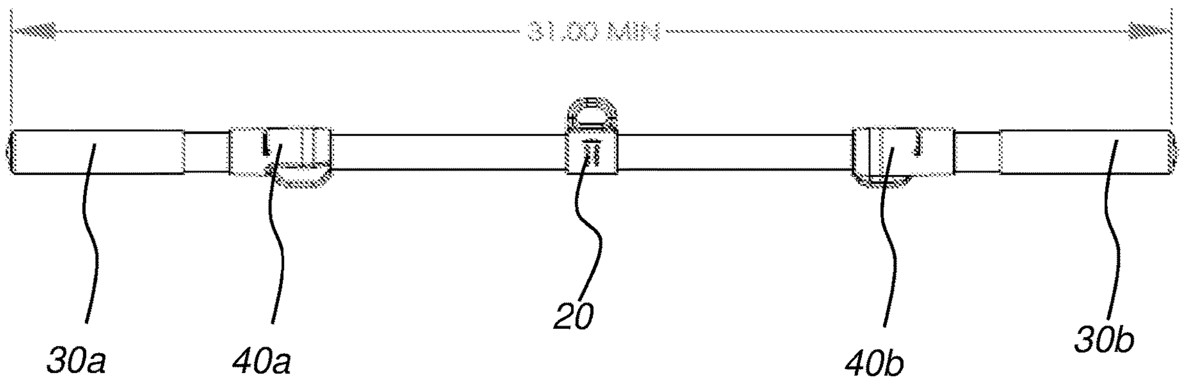
FIG. 5 is a front, plan view of the embodiment of an exercise bar shown in FIG. 3 shown in an extended position.

FIG. 5 shows the exercise bar 10 in a second, extended or longer position. The first clamp assembly 40*a* may be positioned away from a first side of the central hub 20, and the second clamp assembly 40*b* may be positioned away from a second side of the central hub 20 (the second side of the central hub 20 being opposed to the first side). The inner tubes 24*a*, 24*b* may be extended outwardly from outer tubes 28*a*, 28*b*, respectively. That is, the first inner tube 24*a* may be telescoped so that a majority of the first inner tube 24*a* is outside of the first outer tube 28*a*. Similarly, the second inner tube 24*b* may be telescoped so that a majority of the second inner tube 24*b* is outside of the second outer tube 28*b*. This second, extended or longer position may be desirable for some exercises. For example, when using the exercise bar for exercises such as bench press and pulldown simulations, a longer or wider exercise bar 10 may be desired. The exercise bar 10 in this second, extended or longer position may be configured to have any length desired. For example, in the exemplary configuration shown in FIG. 5, the length may be around 70 centimeters to 90 centimeters. In other configurations, the length may be around 75 centimeters to 85 centimeters. Even more particularly, the length may be around 79 centimeters or around 31 inches. In other configurations, the length may be longer or shorter as desired for the second, extended or longer position.

The exercise bar 10 may be formed of any suitable type of materials. For example, the inner tube 24 and/or outer tube 28 may be formed of aluminum, which is durable and economical. In other configurations, the inner tube 24 and/or outer tube 28 may be formed entirely or partially from carbon, which is a strong and lightweight material able to withstand the loads that are contemplated herein. Composites and other suitable materials are also anticipated and contemplated herein. In some configurations, the exercise bar 10 may be formed of materials and/or designed such that the exercise bar 10 may be able to float on the water or otherwise be buoyant. This may be convenient, for example, if the exercise bar 10 is dropped in the water when it is not tethered to any anchors.

Figure 6:
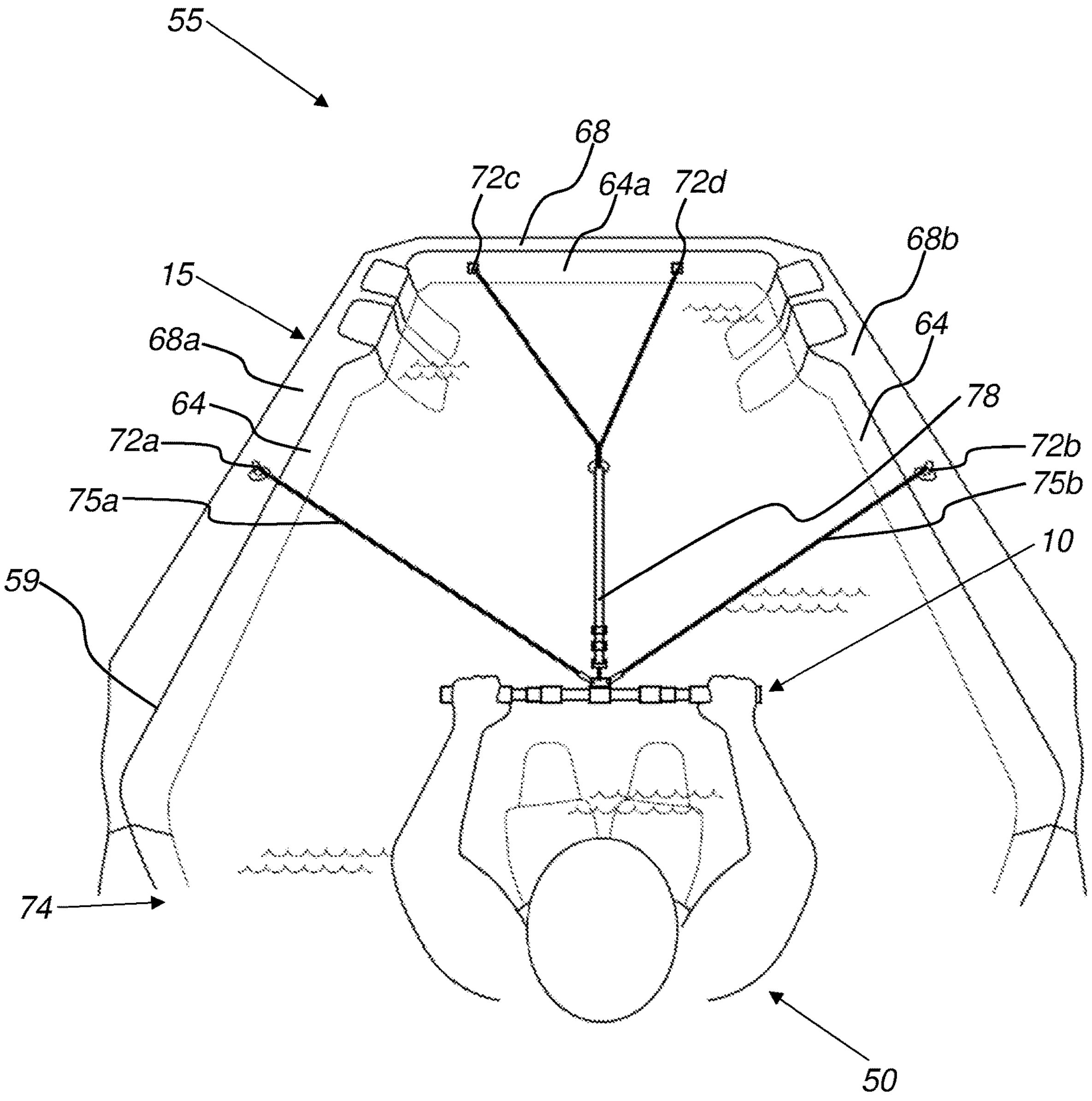
FIG. 6 is a perspective view of an embodiment of an exercise bar in use for rowing in a swim spa.

FIG. 6 illustrates an exemplary system 55 of a spa tub 15 or pool with a user 50 using the exercise bar 10 in a first, retracted position for rowing. The exemplary configuration of the system 55 show in FIG. 6 may generally include a spa 15, and an exercise bar 10. The spa 15 may be any shaped desired, and may include a spa shell 59 with one or more side walls 64 forming a container or space for receiving water. The side walls 64 may have a top edge 68. A cover placed over a spa 15 would typically rest on the top edge 68 of the side wall. One or more anchors 72 or connectors may also be placed on the top edge 68 and/or side walls 64 of the spa shell 59 as desired. By connecting the anchors to the top edge 68 and/or side walls 64 of the spa shell 59, the exercise bar 10 may be placed at a predetermined vertical height. For example, a combination of top edge 68 anchors and side wall 64 anchors may be used to achieve the desired vertical height of the exercise bar 10 in relation to the spa shell 59.

In some configurations, it may be desirable to provide one or more anchors 72 on the spa shell 59. Anchors 72 may be positioned at various locations as desired, including at various positions laterally and vertically. For example, anchors 72*a*, 72*b* may be positioned on the top edge 68 of the spa shell 59. Anchors 72 along the top edge 68 may provide for a higher connection compared to anchors provided in or on a spa side wall 64. In addition to, or instead of, anchors 72 along the top edge 68 of the spa shell 59, anchors 72 may also be provided along one or more spa side walls 64. These anchors may have a closer vertical placement to the water compared to anchors provided along the top edge 68 of the spa shell 59. Depending on the height of the connection desired for the particular exercise, it may be desirable to have a plurality of anchors provided at various locations on the spa shell to allow for many different positions possible for connecting the exercise bar 10 for various exercise options.

In one exemplary configuration for a rowing exercise, anchors 72*c*, 72*d* may be provided along a side wall 64 of the spa shell 59. For example, anchors 72*c*, 72*d* may be provided on a side wall 64 which is opposite the side wall where a user is sitting for rowing. In other words, the anchors may be provided on the side wall 64 which the user is facing while rowing. Anchors 72*a*, 72*b* may be positioned on the top edge 68 of the spa shell 59. In the exemplary configuration shown in FIG. 6, at least one anchor 72*a* is provided on a first top edge 68*a*, and at least one anchor 72*b* is provided on second top edge 68*b*, with first top edge 68*a* opposing second top edge 68*b*. This may provide anchors (72*c*, 72*d*) in front of the user and to the left (72*a*) and right (72*b*) of the user, to allow for a plurality of connection points to the exercise bar 10 to steady it and allow for a comfortable rowing experience.

In the exemplary configuration of FIG. 6, the exercise bar 10 is attached to the anchors 72 via one or more resistance lines. For example, resistance lines 75 of various resistance values may be used as desired to provide different rowing experiences. Resistance lines of a higher resistance may be used when a more difficult or intense rowing experience. Resistance lines of a lower resistance may be used when a less difficult experience is desired, for example for users with a smaller muscle mass. Additionally, the number of resistance lines used may be varied depending on the exercise experience desired.

Resistance lines of different resistance values may also be placed at different positions with respect to the anchors 72 and the exercise bar 10. Any resistance lines known in the art may be used. For example, resistance lines may be formed of latex or synthetic rubber, etc., and may be formed in various lengths, widths, and shapes to provide varying resistance levels. A single resistance band may be used, two or more resistance bands may be used, etc. Additionally, resistance bands may be coupled together and/or to the anchors 72 and/or exercise bar 10. As seen in the exemplary configuration of FIG. 6, in addition to resistance bands being provided parallel or in line with the general direction of movement of the rowing exercise (i.e., from the first end side wall 64*c* to the back of the spa generally indicated at 74), if desired, resistance bands may also be placed in a direction generally perpendicular to the movement of the rowing exercise. This may provide for resistance in additional directions. Resistance band 75*a* may be attached at a first end to the connector 30 of the central hub 20 of the exercise bar 10, and may be attached at a second end to the anchor 72*a* along the top edge 68*a* of the spa shell 59. Similarly, resistance band 75*b* may be attached at a first end to the connector 30 of the central hub 20 of the exercise bar 10, and may be attached at its second end to the anchor 72*b* along the top edge 68*b* of the spa shell 59. In other configurations, these perpendicular resistance bands may not be provided.

In the exemplary configuration of FIG. 6, an extension band 79 may be connected to the connector 30 of the central hub 20. The extension band 78 may have any resistance level desired. For example, extension band 78 may be a resistance cable, or it may be a rope or other connector that is not capable of being stretched like a resistance cable. A first end of the extension band 78 may be connected to the connector 30 of the central hub, with a second end of the extension band 78 connected to two resistance bands (79*a* and 79*b* in FIG. 6). In turn, each of the two resistance bands may connected at their first ends to the extension band 78 and at a second end to the anchors 72*c* and 72*d*, respectively. In other configurations, the extension band 78 may connect directly to an anchor 72 provided in either a side wall 64 or top edge 68 of the spa shell 59.

According to an exemplary method as disclosed herein, a user may row within a swim spa in using a single, short exercise bar (when used to row, exercise bar may be referred to as a "row bar") tethered to a single line or resistance band that provides resistance when pulled. The row bar may be tethered at one or more positions within the spa to provide the resistance desired. For example, the row bar may be tethered in directions perpendicular to the rowing movement. Similarly, the row bar may be tether using various materials that vary in resistance and/or various lengths of tethers to provide the desired resistance. In other configurations, the length and/or material may not be varied, but rather users may merely pull harder or softer on the bar to achieve their desired level of resistance.

According to another method, when the user desires to do exercises that require an exercise bar 10 with a longer length, the user may telescope the inner tubes 24*a*, 24*b* with respect to the outer tubes 28*a*, 28*b* respectively. The user may then use the same exercise bar 10 to do exercises that require their hands to be placed farther apart.

Aspect 1: A spa rowing system comprising: a spa shell comprising at least one anchor on a first end of the spa shell, at least one anchor on a first lateral side of the spa shell, and at least one anchor on a second lateral side of the spa shell, the first lateral side opposing the second lateral side of the spa shell;

an exercise bar with a first handle to be gripped by a user's first hand and a second handle to be gripped by a user's second hand, the exercise bar adjustable between a first, shorter length and a second, longer length;

a connector mounted to the exercise bar;

a first resistance cable having a first end connectable to the connector of the exercise bar and a second end connectable to the at least one anchor on the first end of the spa shell, to enable the exercise bar to be pulled away from the first end of the spa shell under resistance of the first resistance cable.

Aspect 2: the spa rowing system of Aspect 1, further comprising:

a second resistance cable having a first end connectable to the connector of the exercise bar and a second end connectable to the at least one anchor on the first lateral side of the spa shell; and a third resistance cable having a first end connectable to the connector of the exercise bar and a second end connectable to the at least one anchor on the second lateral side of the spa shell, the second resistance cable and third resistance cable to provide resistance in a generally perpendicular direction to the resistance of the first resistance cable.

Aspect 3: The spa rowing system of Aspect 1 or Aspect 2, wherein the spa shell comprises a top edge and a side wall, and wherein the at least one anchor on the first end of the spa shell is on a side wall, and wherein the at least one anchor on the first lateral side of the spa shell is on the top edge, and wherein the at least one anchor on the second lateral side of the spa shell is on the top edge, the at least one anchor on the first end of the spa shell being located vertically below the at least one anchor on the first lateral side and the at least one anchor on the second lateral side, to enable connection of the exercise bar at a predetermined height.

Aspect 4: The spa rowing system of any of Aspects 1-3, wherein the system further comprises an extension band, the extension band having a first end connectable to the connector of the exercise bar and a second end connectable to one or more resistance cables.

Aspect 5: The spa rowing system of any of Aspects 1-4, wherein the second end of the extension band is connected to the first end of the first resistance cable.

Aspect 6: the spa rowing system of any of Aspects 1-5, wherein the system further comprises a fourth resistance cable and a wherein the at least one anchor on the first end of the spa shell comprises at least a first anchor and a second anchor, the fourth resistance cable having a first end connected to the second end of the extension band and a second end connected to the second anchor on the first end of the spa shell.

Aspect 7: the spa rowing system of any of Aspects 1-6, wherein the first anchor and the second anchor on the first end of the spa are located on a side wall of the spa shell.

Aspect 8: The spa rowing system of any of Aspects 1-7, wherein the exercise bar comprises:

a central hub;

a first inner tube attached to a first side of the central hub and a first outer tube in telescoping connection with the first inner tube, the first handle in connection with the first outer tube;

a second inner tube attached to a second side of the central hub, the second side of the central hub being opposed to the first side of the central hub, and a second outer tube in telescoping connection with the second inner tube, the second handle in connection with the second outer tube; and the connector mounted to the central hub.

Aspect 9: The spa rowing system of any of Aspects 1 through 8, wherein the connector mounted to the central hub is a pivotable connector.

Aspect 10: The spa rowing system of any of Aspects 1 through 9, wherein the exercise bar is continuously adjustable.

Aspect 11: A spa rowing system comprising:

a spa shell comprising at least one anchor;

an exercise bar with a first handle to be gripped by a user's first hand and a second handle to be gripped by a user's second hand;

a connector mounted to the exercise bar;

a first resistance cable having a first end connectable to the connector of the exercise bar and a second end connectable to the anchor of the spa shell, to enable the exercise bar to be pulled toward the user against the resistance of the first resistance cable, and released.

Aspect 12: The spa rowing system of Aspect 11, wherein the exercise bar is adjustable between a first, shorter length and a second, longer length.

Aspect 13: The spa rowing system of Aspect 11 or 12, wherein the exercise bar is continuously adjustable.

Aspect 14: The spa rowing system of any of Aspects 11 through 13, further comprising:

a second resistance cable having a first end connectable to the connector of the exercise bar and a second end connectable to the at least one anchor on a first lateral side of the spa shell; and a third resistance cable having a first end connectable to the connector of the exercise bar and a second end connectable to the at least one anchor on a second lateral side of the spa shell, the second resistance cable and third resistance cable to provide resistance in a generally perpendicular direction to the resistance of the first resistance cable.

Aspect 15: The spa rowing system of Aspects 11 through 14, wherein the spa shell comprises a top edge and a side wall, and wherein the at least one anchor on the first end of the spa shell is on a side wall, and wherein the at least one anchor on the first lateral side of the spa shell is on the top edge, and wherein the at least one anchor on the second lateral side of the spa shell is on the top edge, the at least one anchor on the first end of the spa shell being located vertically below the at least one anchor on the first lateral side and the at least one anchor on the second lateral side, to enable connection of the exercise bar at a predetermined height.

Aspect 16: The spa rowing system of any of Aspects 11 through 15, wherein the system further comprises an extension band, the extension band having a first end connectable to the connector of the exercise bar and a second end connectable to one or more resistance cables.

Aspect 17: The spa rowing system of any of Aspects 11 through 16, wherein the exercise bar comprises:

a central hub;

a first inner tube attached to a first side of the central hub and a first outer tube in telescoping connection with the first inner tube, the first handle in connection with the first outer tube;

a second inner tube attached to a second side of the central hub, the second side of the central hub being opposed to the first side of the central hub, and a second outer tube in telescoping connection with the second inner tube, the second handle in connection with the second outer tube; and the connector mounted to the central hub.

Aspect 18: The spa rowing system of any of Aspects 11 through 17, wherein the connector mounted to the central hub is a pivotable connector.

Aspect 19: An adjustable exercise bar comprising:

a central hub;

a first inner tube attached to a first side of the central hub and a first outer tube in telescoping connection with the first inner tube;

a first handgrip in connection with the first outer tube, the first handgrip to be gripped by a user's first hand;

a second inner tube attached to a second side of the central hub, the second side of the central hub being opposed to the first side of the central hub, and a second outer tube in telescoping connection with the second inner tube;

a second handgrip in connection with the second outer tube, the second handgrip to be gripped by a user's second hand;

a connector mounted to the central hub, the connector to enable the exercise bar to be connected to one or more resistance cables; and wherein the exercise bar is adjustable from a first, shorter length for use with exercises in which a user's hands are positioned closer together and a second, longer length for use with exercises in which a user's hands are positioned father apart.

Aspect 20: The adjustable exercise bar of Aspect 19, wherein the connector mounted to the central hub is a pivotable connector.

Although the foregoing disclosure provides many specifics, such as use of the system in spas, it will be appreciated that pools, and other water holding devices are contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

The invention claimed is:

1. A spa rowing system comprising:

a spa shell comprising at least one anchor;

an exercise bar with a first handle to be gripped by a user's first hand and a second handle to be gripped by a user's second hand;

a connector mounted to the exercise bar;

a first resistance cable having a first end connectable to the connector of the exercise bar and a second end connectable to the anchor of the spa shell, to enable the exercise bar to be pulled toward the user against the resistance of the first resistance cable, and released; and an extension band, the extension band having a first end connectable to the connector of the exercise bar and a second end connectable to one or more resistance cables.

2. The spa rowing system of claim 1, wherein the exercise bar is adjustable between a first, shorter length and a second, longer length.

3. The spa rowing system of claim 2, wherein the exercise bar is telescopically adjustable.

4. The spa rowing system of claim 1, further comprising:

a second resistance cable having a first end connectable to the connector of the exercise bar and a second end connectable to the at least one anchor on a first lateral side of the spa shell; and a third resistance cable having a first end connectable to the connector of the exercise bar and a second end connectable to the at least one anchor on a second lateral side of the spa shell, the second resistance cable and third resistance cable to provide resistance in a generally perpendicular direction to the resistance of the first resistance cable.

5. The spa rowing system of claim 4, wherein the spa shell comprises a top edge and a side wall, and wherein the at least one anchor on the first end of the spa shell is on a side wall, and wherein the at least one anchor on the first lateral side of the spa shell is on the top edge, and wherein the at least one anchor on the second lateral side of the spa shell is on the top edge, the at least one anchor on the first end of the spa shell being located vertically below the at least one anchor on the first lateral side and the at least one anchor on the second lateral side, to enable connection of the exercise bar at a predetermined height.

6. The spa rowing system of claim 1, wherein the exercise bar comprises:

a central hub;

a first inner tube attached to a first side of the central hub and a first outer tube in telescoping connection with the first inner tube, the first handle in connection with the first outer tube;

a second inner tube attached to a second side of the central hub, the second side of the central hub being opposed to the first side of the central hub, and a second outer tube in telescoping connection with the second inner tube, the second handle in connection with the second outer tube; and the connector mounted to the central hub.

7. The spa rowing system of claim 6, wherein the connector mounted to the central hub is a pivotable connector.

8. A spa rowing system comprising:

a spa shell comprising a top edge and a side wall, at least one anchor on a first end of the spa shell on the side wall, at least one anchor on a first lateral side of the spa shell on the top edge, and at least one anchor on a second lateral side of the spa shell on the top edge, the first lateral side opposing the second lateral side of the spa shell, the at least one anchor on the first end of the spa shell being located vertically below the at least one anchor on the first lateral side and the at least one anchor on the second lateral side;

an exercise bar with a first handle to be gripped by a user's first hand and a second handle to be gripped by a user's second hand, the exercise bar adjustable between a first, shorter length and a second, longer length via one or more clamp assemblies, the one or more clamp assemblies comprising a cut-away groove, the exercise bar capable of connection to the spa shell at a predetermined height;

a connector mounted to the exercise bar;

a first resistance cable having a first end connectable to the connector of the exercise bar and a second end connectable to the at least one anchor on the first end of the spa shell, to enable the exercise bar to be pulled away from the first end of the spa shell under resistance of the first resistance cable;

a second resistance cable having a first end connectable to the connector of the exercise bar and a second end connectable to the at least one anchor on the first lateral side of the spa shell;

a third resistance cable having a first end connectable to the connector of the exercise bar and a second end connectable to the at least one anchor on the second lateral side of the spa shell, the second resistance cable and third resistance cable to provide resistance in a generally perpendicular direction to the resistance of the first resistance cable, and an extension band, the extension band having a first end connectable to the connector of the exercise bar and a second end connectable to one or more resistance cables.

9. The spa rowing system of claim 8, wherein the second end of the extension band is connected to the first end of the first resistance cable.

10. The spa rowing system of claim 9, wherein the system further comprises a fourth resistance cable and a wherein the at least one anchor on the first end of the spa shell comprises at least a first anchor and a second anchor, the fourth resistance cable having a first end connected to the second end of the extension band and a second end connected to the second anchor on the first end of the spa shell.

11. The spa rowing system of claim 10, wherein the first anchor and the second anchor on the first end of the spa shell are located on a side wall of the spa shell.

12. The spa rowing system of claim 8, wherein the exercise bar comprises:

a central hub;

a first inner tube attached to a first side of the central hub and a first outer tube in telescoping connection with the first inner tube, the first handle in connection with the first outer tube;

a second inner tube attached to a second side of the central hub, the second side of the central hub being opposed to the first side of the central hub, and a second outer tube in telescoping connection with the second inner tube, the second handle in connection with the second outer tube; and the connector mounted to the central hub.

13. The spa rowing system of claim 12, wherein the connector mounted to the central hub is a pivotable connector.

14. The spa rowing system of claim 8, wherein the exercise bar is telescopically adjustable.

15. An adjustable exercise bar comprising:

a central hub;

a first inner tube attached to a first side of the central hub and a first outer tube in telescoping connection with the first inner tube;

a first handgrip in connection with the first outer tube, the first handgrip to be gripped by a user's first hand;

a second inner tube attached to a second side of the central hub, the second side of the central hub being opposed to the first side of the central hub, and a second outer tube in telescoping connection with the second inner tube;

a second handgrip in connection with the second outer tube, the second handgrip to be gripped by a user's second hand;

a connector mounted to the central hub, the connector to enable the adjustable exercise bar to be connected to one or more resistance cables; and wherein the adjustable exercise bar is adjustable from a first, shorter length for use with exercises in which a user's hands are positioned closer together and a second, longer length for use with exercises in which a user's hands are positioned father apart.

16. The adjustable exercise bar of claim 15, wherein the connector mounted to the central hub is a pivotable connector.

* * * * *